United States Patent [19]

Day

[11] Patent Number: 4,498,798
[45] Date of Patent: Feb. 12, 1985

[54] LOCATING PIN

[75] Inventor: Donald C. Day, Sugar Grove, Ill.

[73] Assignee: AMSTED Industries Incorporated, Chicago, Ill.

[21] Appl. No.: 535,570

[22] Filed: Sep. 26, 1983

[51] Int. Cl.³ .............................................. F16B 13/00
[52] U.S. Cl. ........................................ 403/24; 403/13; 137/315; 411/110; 251/305
[58] Field of Search ..................... 411/110; 403/13, 14, 403/24, 25; 137/315; 251/305

[56] References Cited

U.S. PATENT DOCUMENTS 2,855,970 10/1958 Neuschotz ........................... 411/110
4,322,174 3/1982 Ishii et al. .............................. 403/14

FOREIGN PATENT DOCUMENTS 1427010 3/1976 United Kingdom .................. 403/14

Primary Examiner—Andrew V. Kundrat
Attorney, Agent, or Firm—Charles E. Bouton; Fred P. Kostka

[57] ABSTRACT

A locating pin having a generally cylindrical, threaded lower portion and an axially aligned, nonthreaded upper portion is provided. The threaded lower portion has at least one vertical slot in which is located a locking bar. The locking bar has a flat lower portion that permits the pin to be threaded into a receiving opening. The locking bar has a wedge shaped upper portion that is driven down into the opening to retain the pin therein. The upper portion of the pin extends from the opening to provide a locating pin.

3 Claims, 7 Drawing Figures

U.S. Patent  Feb. 12, 1985  Sheet 1 of 2  4,498,798
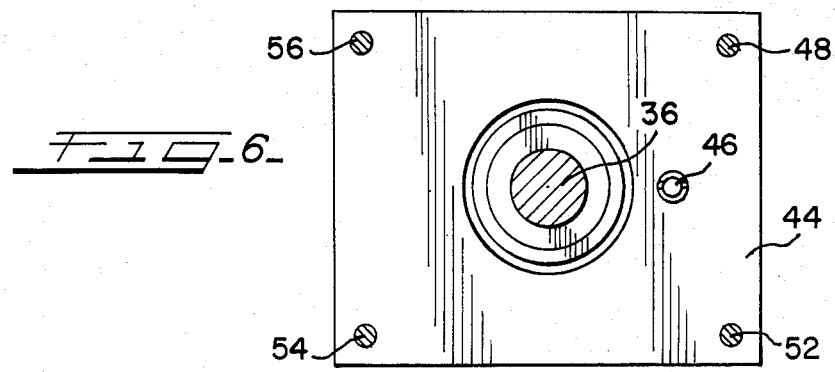
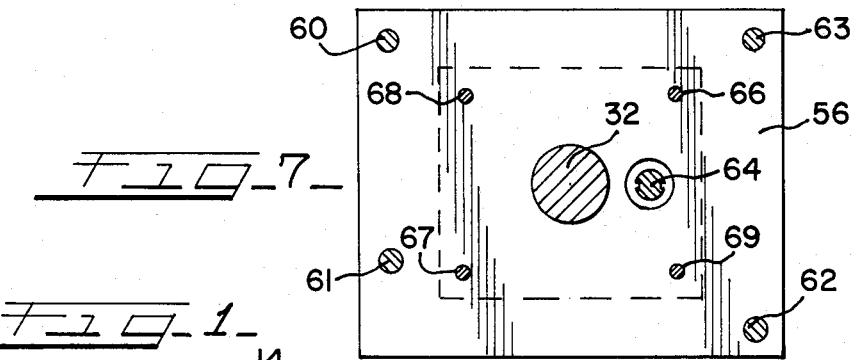
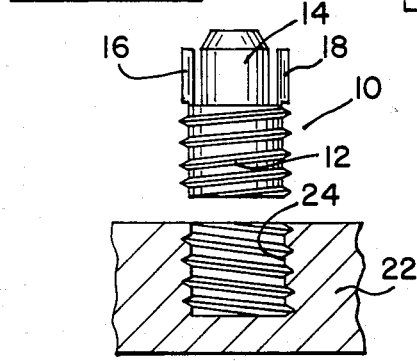
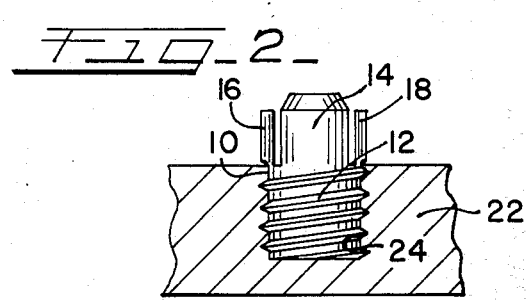
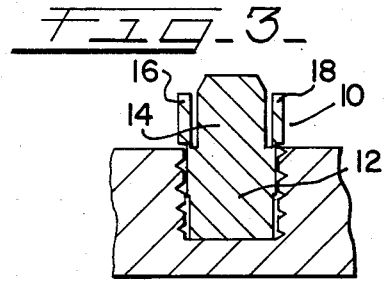
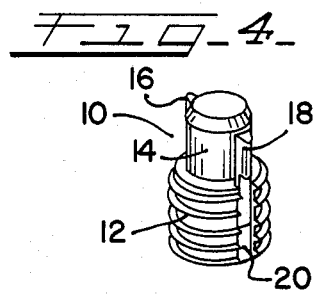

LOCATING PIN

BACKGROUND OF THE INVENTION

The present invention relates to a position locating pin and, more particularly, to a pin adapted to be installed in one surface in an essentially nonremovable manner so as to assure the positive positioning of a second surface adjacent the first surface.

In the bolted assembly of many devices, it is desirable to assure the reassembly of two joined surfaces in the same orientation as previously. Especially in out-of-door or field conditions, a nonremovable alignment aid is desirable. Such a device could take many forms, and the present invention relates to a pin or plug type device of generally cylindrical shape. The bottom portion of the device is threaded for acceptance into a threaded receiving opening in one surface to be joined. As will be described below, a locking bar slidably affixed to the pin slides downwardly to engage the threaded opening and effectively lock the pin to the one surface. The upper portion of the pin includes a generally cylindrical section which extends outward from the first surface. The second surface has an opening to receive the upper pin portion to assure the desired alignment of the surfaces. Accordingly, when the two surfaces have been separated, their reassembly in the initial orientation is assured due to the presence of the locating pin in the first surface.

In valves having above ground or remote operators, it is essential that the operator indicate the correct valve condition, i.e., open or closed. If the operator assembly and position indicator are removed from the operator support column, it is necessary for the operator to be replaced on the column in the same orientation that it was removed. It is physically impossible to determine the condition of the valve without opening the valve body to see the valve disc. This is extremely difficult and costly when a valve is located underground.

Further, if the operator support column is removed from the platform of the valve body, it is again essential that the column be reattached to the platform in the same orientation that it was removed.

One previously known method of assuring the alignment of the operator on the support column is to asymmetrically locate the bolt holes in the operator assembly base and the upper plate of the support column or in the valve platform and the lower plate of the support column. By such location of the adjoining surface boltholes, the reassembly of the adjoining surfaces is virtually assured. However, if the adjoining surfaces are not appropriately aligned and certain boltholes are accordingly not in axial alignment, it is possible for a field crew to not install the bolt in the nonaligned hole, and to place the bolts in the aligned holes. Accordingly, the joining surfaces could be out of orientation with each other with, in the case of valve operators, the serious problems outlined above.

Accordingly, it is an object of the present invention to provide a nonremovable locating pin that, when employed between two adjoining surfaces, assures the proper relative orientation of such surfaces.

SUMMARY OF THE INVENTION

The present invention provides a locating pin adapted to be inserted into one surface in an essentially nonremovable manner. A second surface to be adjoined to such first surface has an acceptance cavity which must be aligned with a portion of the pin extending above the first surface to assure relative alignment of the two surfaces.

The locating pin comprises a lower, generally cylindrical, threaded section and an upper, generally cylindrical, axially aligned nonthreaded section. The lower section has at least one vertical slot or gap therein. A locking bar is located in the slot. The bar comprises a lower flat section which is fitted within the slot so as to enable the bar to slide within the slot. The upper section of the bar comprises a wedge shaped bar. Upon the placement of the threaded section of the pin in a threaded receiving cavity in a first surface, the locking bar is driven downward so as to engage the wedge shaped section of the bar with the threads of the receiving cavity. Accordingly, the locating pin is for all purposes permanently inserted into the first surface.

The second surface to be placed in engagement with the first surface has a cavity which, when the two surfaces are placed in the desired relative orientation to each other, receives the upper section of the locating pin. Unless the second surface cavity is aligned to receive the upper portion of the pin, it is impossible to place the two surfaces in abutting engagement as the upper portion of the pin extends outwardly from the first surface.

In particular, the present invention provides a nonremovable locating pin comprising a generally cylindrical, threaded lower portion, at least one vertical slot in said threaded portion, a generally cylindrical upper portion affixed to and axially aligned with said lower portion, a locking bar having a generally flat lower section fitted in said vertical slot of said threaded lower pin portion and an upper wedge shaped section, said locking bar adapted to slide downward in said vertical slot such that said locating pin is locked in place in a receiving threaded opening in a mounting surface.

The present invention is useful in several applications. One such application is in a valve operator wherein a valve is located remote from the operator. It is imperative that the operator, when removed from the support column for maintenance or other reasons, can be replaced on the support column in identical relative orientation with the column. The locating pin is threaded into a receiving cavity in the upper plate of the support column. The protruding upper portion of the pin extends into a cavity in the bottom plate of the operator to assure the desired orientation between the operator and the support column. This assures the position indicator on the operator will indicate the correct position of the valve disc.

In particular, the present invention provides a valve operating assembly comprising a valve body, a valve platform affixed to the valve body, an adapter plate joined to the valve platform, a support column lower plate joined to said adapter plate, a support column having a lower end affixed to the support column lower plate and an operator attached to the upper end of the support column, wherein an upper plate is affixed to the upper end of the support column intermediate the support column and the operator, the upper plate and the operator being joined by a plurality of bolts joining aligned threaded holes in the upper plate and the operator bottom plate, and a locating pin is received in the upper plate in a threaded receiving opening, the locating pin comprising a threaded, generally cylindrical lower portion extending into the upper plate receiving opening, and an upper, generally cylindrical portion extending into a cavity in the operator bottom plate, the locating pin having at least one vertical slot in the threaded lower portion thereof, and a locking bar in the vertical slot adapted to slide downwardly to lock the locating pin within the threaded receiving opening of the upper plate.

BRIEF DESCRIPTION OF THE DRAWINGS

In the drawings,

FIG. 1 is a side view of the locating pin and of the threaded receiving cavity in partial cross section;

FIG. 2 is a side view of the locating pin within the threaded receiving cavity, in partial cross section with the locking bars not yet driven into the threads;

FIG. 3 is a cross section view of the locating pin within the threaded receiving cavity;

FIG. 4 is a perspective view of the locating pin;

FIG. 6 is a view of the support column upper plate along lines 6—6 of FIG. 5, and FIG. 7 is a view of the adapter plate along lines 7—7 of FIG. 5.

DESCRIPTION OF THE PREFERRED EMBODIMENT

Figure 5:
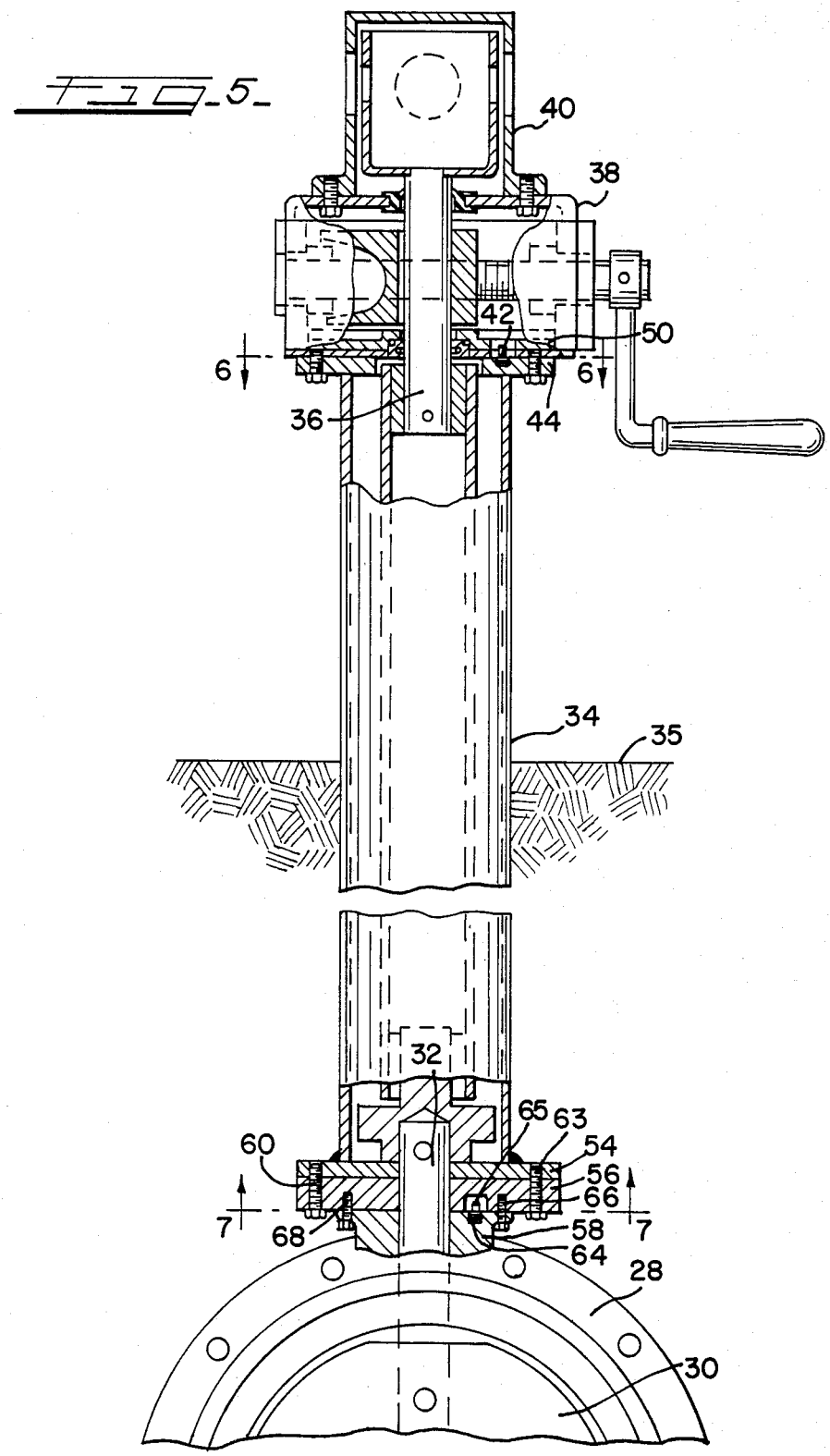
FIG. 5 is a partial side view in partial cross section of a valve and valve operator employing the present invention.

Referring now to FIGS. 1-4 of the drawings, the preferred embodiment of the locating pin is shown. The pin 10 is generally cylindrical with a lower cylindrical threaded section 12 and an axially aligned, upper cylindrical section 14. Lower section 12 is adapted to be threaded into a threaded receiving opening 24 in surface 22.

Locking bars 16 and 18 are filled within slots in the threaded lower portion 12 of pin 10. Bar 18 comprises an upper, wedge shaped section and a lower, flat section received in slot 20. The flat lower section permits pin 10 to be threaded into opening 24. Bars 16 and 18 can be driven downwardly when pin 10 is threaded into receiving opening 24 to effectively lock pin 10 to the surface 22. Upper cylindrical section 14 will extend from surface 22.

Referring now to FIGS. 5-7, a valve and valve operator are shown. Valve body 28 holds valve disc 30 therein. Valve shaft 32 enables disc 30 to be turned. Support column 34 extends upwardly from valve body 28 above ground level 35. Operator shaft 36 extends into valve operator 38 and indicator 40. To assure proper alignment of valve operator 38 on support column 34, locating pin 42 similar to pin 10 is threadably inserted into receiving opening 46 in support column upper plate 44.

The upper portion of pin 42 extends into bottom plate 50 of operator 38. Note that bolts 48, 52, 54, 56 holding upper plate 44 to bottom plate 50 would provide rotational alignment of valve operator 38 only to the degree that top bolt pair 48, 56 is closer to bottom pair 52, 54 so that alignment with a 180° certainty would be possible. However, with the addition of locating pin 42, operator 38 can only be installed in one degree of rotation giving absolute certainty of the proper alignment of operator 38, indicator 40 and valve body 28.

Further, valve body 28 has a valve platform housing 58 passing through an opening therein whereby valve shaft 32 is affixed to valve disc 30. Support column 34 has a lower plate 54 affixed thereto. Support column lower plate 54 is abutted to adapter plate 56 which itself abuts housing 58. It is essential that if support column 34, lower plate 54 and adapter plate 56 are removed from housing 58, they can be replaced in their original relative orientation. Bolts 60, 61, 62 and 63 holding support column lower plate 54 to adapter plate 56 have one bolt 61 and corresponding boltholes offset from a rectangular configuration to assure the proper realignment of the two surfaces. However, as mentioned above, a 180° misalignment could occur between these surfaces if two bolts were not installed, but as these surfaces are not separated in the field under normal conditions, the chance for such misalignment is small. However, adapter plate 56 is separated from valve platform housing 58 under field conditions by the removal of bolts 66, 67, 68 and 69. Accordingly, a locating pin 64 similar to pin 10 described above is threaded into an opening in housing 58. When adapter plate 56 is replaced on housing 58, its proper relative orientation is assured due to the presence of cavity 65 in adapter plate 56 which must be aligned with the upper portion of pin 64.

What is claimed is:

1. A valve operating assembly comprising: a valve body, a valve platform affixed to the valve body, an adapter plate joined to the valve platform, a support column lower plate joined to said adapter plate, a support column having a lower end affixed to the support column lower plate and an operator attached to the upper end of the support column, wherein said adapter plate is bolted to said valve platform and the said operator is bolted to an upper plate affixed to the upper end of said support column and proper alignment of the bolted parts is obtained by at least one locating pin having a threaded portion irremovably secured in a threaded receiving opening on one such part and a non-threaded cylindrical portion received in a cavity in the adjacent part bolted thereto, said threaded portion of said locating pin including means to lock said pin against further rotation in the threaded receiving opening whereby it is secured against removal.

2. A valve operating assembly comprising
a valve body, a valve platform affixed to the valve body, an adapter plate joined to the valve platform, a support column lower plate joined to said adapter plate, a support column having a lower end affixed to the support column lower plate and an operator attached to the upper end of the support column,
wherein the adapter plate and the valve platform are joined by a plurality of bolts joining aligned threaded holes in the adapter plate and the valve platform,
and a locating pin received in the valve platform in a threaded receiving opening,
the locating pin comprising a threaded, generally cylindrical lower portion extending into the valve platform receiving opening, and an upper, generally cylindrical portion extending into a cavity in the adapter plate, the locating pin having at least one vertical slot in the threaded lower portion thereof, and a locking bar in the vertical slot adapted to slide downwardly to lock the locating pin within the threaded receiving opening of the valve platform.

3. A valve operating assembly comprising
a valve body, a valve platform affixed to the valve body, an adapter plate joined to the valve platform, a support column lower plate joined to said adapter plate, a support column having a lower end affixed to the support column lower plate and an operator attached to the upper end of the support column, wherein an upper plate is affixed to the upper end of the support column intermediate the support column and the operator, the upper plate and the operator being joined by a plurality of bolts joining aligned threaded holes in the upper plate and the operator bottom plate, and a locating pin received in the upper plate in a threaded receiving opening, the locating pin comprising a threaded, generally cylindrical lower portion extending into the receiving opening, and an upper, generally cylindrical portion extending into a cavity in the operator bottom plate, the locating pin having at least one vertical slot in the threaded lower portion thereof, and a locking bar in the vertical slot adapted to slide downwardly to lock the locating pin within the threaded receiving opening of the upper plate.

* * * * *